Sept. 29, 1964     I. COLUCCI     3,151,224
DEVICE CONTROLLING THE LIGHTING OF LAMPS
INSIDE MOTOR VEHICLES AND THE LIKE Filed July 5, 1961     3 Sheets-Sheet 1

United States Patent Office 3,151,224
Patented Sept. 29, 1964

3,151,224
DEVICE CONTROLLING THE LIGHTING OF LAMPS INSIDE MOTOR VEHICLES AND THE LIKE
Ivo Colucci, Milan, Italy, assignor to Alfa Romeo S.p.A., Milan, Italy, a company of Italy
Filed July 5, 1961, Ser. No. 121,909
Claims priority, application Italy July 28, 1960
4 Claims. (Cl. 200—61.62)

The present invention relates to a device controlling the lighting of lamps inside motor vehicles and the like.

Devices are known which, in combination with the positioning of the doors, cause the lamps illuminating the inside of a vehicle to be lighted.

These devices are generally composed of an electric circuit which is automatically closed or not closed on opening one of the doors, according to the previous setting of an appropriate manual control which may be a simple switch placed in series in the circuit, or a mechanical stop which allows or prevents the making of a contact between conductors when the doors are opened, or some other device.

It is usually the case, however, that the automatic switch which closes the circuit on the opening of one of the doors is placed at a distance from the manual control, so that electrical conductors of a certain length which must furthermore be passed through areas not always easily accessible, are required; the arrangement is further complicated when automatic switches are required on more than one door.

The device according to the present invention eliminates the hereabove mentioned drawbacks and others in that it allows the switch placed in the input circuit of the lamp and the means permitting or preventing the functioning thereof, to be combined and brought together in a single position in the car or the like to which the assembly can be fitted very simply and without providing complicated wiring.

To be precise, the device according to the present invention is essentially characterized in that it comprises in a single supporting body a switch placed in the circuit containing the lamp and the source of electric power, which can be actuated by pushbuttons controlled by the doors of the vehicle or the like, and, also in said circuit, a manually operated means with three positions for presetting said switch so as to render the circuit inactive or so as to bring about continuous working independently of the doors, or so as to give working under the control of said doors.

The device according to the invention lends itself to numerous embodiments, some of which will now be more fully described, purely for illustrative purposes without limiting the invention, with reference to the accompanying drawings wherein.

Figure 11:
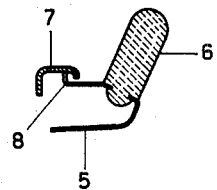
Figure 4:
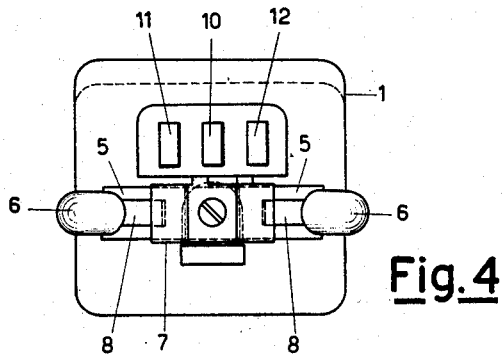
FIG. 4 is a rear view in elevation.
Figure 8:
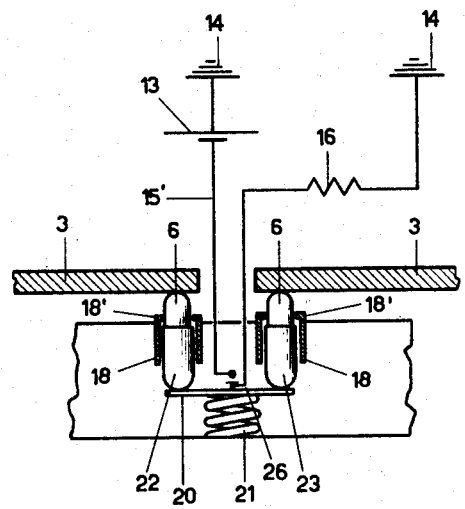
Figure 9:
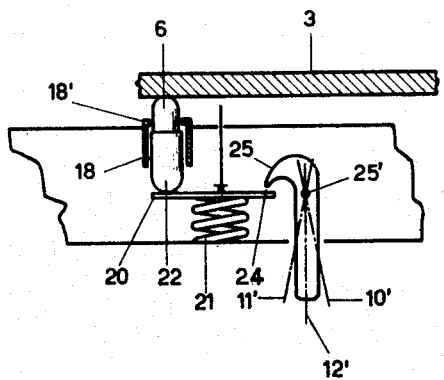
Figure 10:
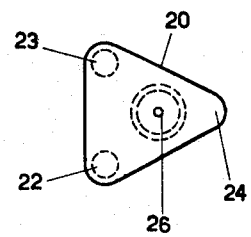

FIGURES 8, 9 and 10 relate to another embodiment of the device according to the invention, applied for illustrative purposes to a vehicle with four doors;

FIG. 11 relates to a variant of a constructional detail.

Figure 1:
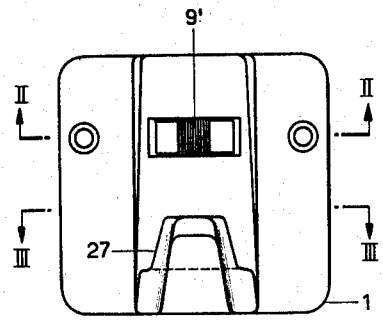
FIG. 1 shows diagrammatically in a front elevation view an embodiment of the device according to the present invention, designed to be fitted to a vehicle with four doors and doorposts.
Figure 2:
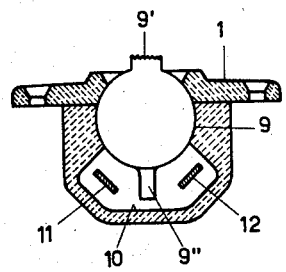
FIG. 2 shows a cross-section along the line II—II of FIG. 1.
Figure 3:
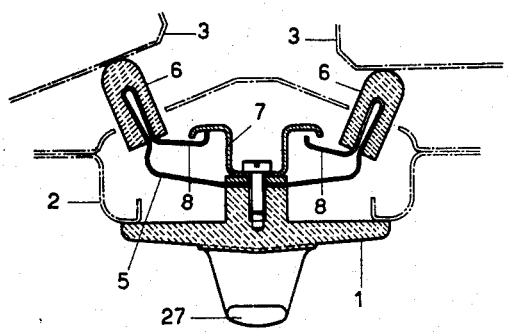
FIG. 3 shows a cross-section along the line III—III of FIG. 1.

Referring first of all to FIGURES 1 to 5, the device according to the invention comprises a body 1 of insulating material, which is fitted to or incorporated in the doorpost 2 of a vehicle (not shown) with four doors, of which two only are visible in FIGURE 3, the one on the left in FIG. 3 being shown open. The flexible conducting strip 5 carrying two studs 6 of insulating material, is attached to the body 1; on body 1 there is also mounted the rigid metal contact member 7 which is insulated from strip 5.

Figure 5:
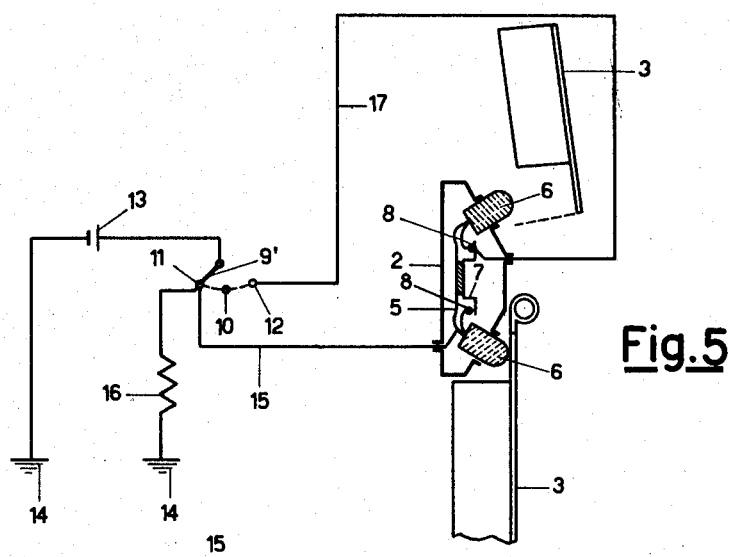
FIG. 5 shows the wiring diagram of the device illustrated in FIGURES 1 to 4.
Figure 6:
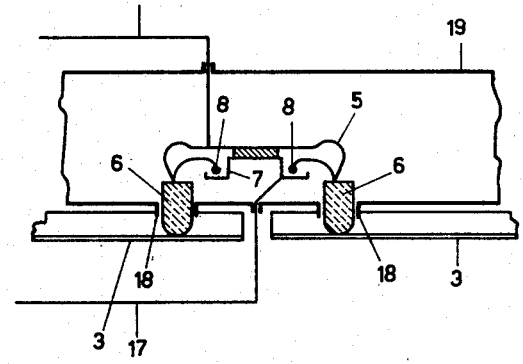
FIG. 6 shows a diagram of the device in the case of application to a vehicle with four doors without doorposts.
Figure 7:
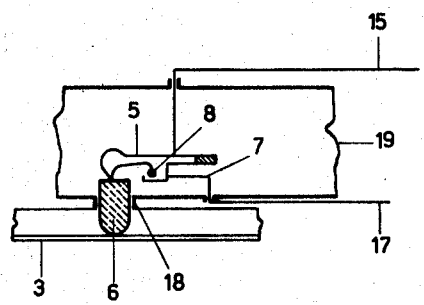
FIG. 7 shows, similarly, the case of an application to a vehicle with two doors.

This contact member 7 closes the circuit feeding the lamp, when it comes into electrical contact with one of the ends 8 of the flexible strip member 5, and this takes place when the respective door 3 is opened as is shown on the left of FIG. 3, while said contact member keeps at a certain distance from said ends 8, thus keeping the circuit open, when the doors 3 are closed and press against the studs 6, as may be seen on the right of FIG. 3. Body 1 further comprises a switch 9 the lever 9' whereof has three positions of which one (the central one indicated by the numeral 10 in FIG. 2) is inactive, and two are active and bring the switch contacter 9" in contact with one of the spring-loaded conducting members 11 and 12 for purposes which will now be disclosed. Referring to FIG. 5, the source of electrical energy (a battery of accumulators or the like) 13 is connected on one side to earth 14 and on the other side to the three-position manually operated switch 9. The conducting member 11 is inserted in circuit 15 containing lamp 16 and connected at one end to earth 14 and at the other to strip 5. Member 12 constitutes one end of cable 17 the other end of which is connected to contact 7. It is manifest that when lever 9' is in the position wherein contacter 9" is electrically connected to member 11, lamp 16 functions continuously and independently of the position of the doors; when it is at the position of 10, the circuit is open and lamp 16 remains extinguished; whilst when it is at the position of member 12, the lighting of the lamp will depend on the opening of at least one of the doors 3, as already hereinabove disclosed. FIGS. 6 and 7, which show similar component parts similarly numbered (as in the previous figures), have no need of further explanation. It may only be observed that, in these embodiments, studs 6 run in guiding sleeves 18 as the device is fitted to the frame 19 of the door or doors 3. In FIGURES 8, 9 and 10 an embodiment comprising a member 20 which acts as a rocker, is shown. The rocker plate 20 is urged by a spring 21 against three points 22, 23 and 24 at two of which (22 and 23) there are two studs 6 (guided and retained by sleeves 18) which rest in turn against the doors 3 of the vehicle, there being at point 24 a stop 25 which can be caused to take up three different positions by manual control. Furthermore, the central part of plate 20 carries contact 26 which is connected to bulb 16 and earth 14. When stop 25, which is pivoted at 25', is in position 12' and doors 3 are closed, contact 26 of plate 20 is not able to touch conductor 15' coming from battery 13 and the circuit is hence open; if, however, one of the doors is opened, the corresponding rest of plate 20 gives way and the plate itself pivots about the axis constituted by the other rest and point 24 until contact 26 makes contact with conductor 15' thus causing the lamp to light; in a similar manner, if both doors are opened, the plate pivots about the axis passing through point 24 and parallel to the straight line joining 22 and 23, until the contact is made. If, on the other hand, stop 25 is in position 10' when one of the doors is opened, then the plate cannot reach to touch conductor 15' because of the end stops 18' which are set in appropriate positions, and therefore the circuit remains open. Finally, if stop 25 is in position 11', the contact between plate 20 and 15' is made even though doors 3 may be closed, and this is the position used for reading, etc. The embodiment illustrated in FIGURES 8, 9 and 10 can be fitted in any point of the doorpost and frame member or of the door frame, in a similar manner to that described for the embodiment of FIGURES 6 and 7. Other embodiments which are not illustrated can be provided by fitting devices with a single stud, in the positions indicated in the previous figures, these embodiments being of use when, in a four-door vehicle, it is desired to control the lamp by, for example, the opening of the front doors only. The support body 1 may furthermore be so shaped as to permit an auxiliary use by having, for example, a hook projection 27 whereon to hang garments, or a pin whereon to engage a handle for passengers to hold on to, or a hollow seat to house an ashtray or the like, this supplementary use being, of course, consistent with the position occupied by the device. Constructional variants, such as that indicated in FIG. 11 for the studs, can be introduced without on that account departing from the scope of the present invention. The end applications may also vary as, for example, in the use of the device for refrigerator doors or for the doors or dwelling houses as a remote alarm signal indicating their opening, and so on.

I claim:

1. A switch for controlling a lamp of a motor vehicle in response to opening and closing of the doors of the vehicle, said switch comprising a body, a rigid metallic generally U-shaped fixed contact member secured to said body, said member having outwardly extending oppositely disposed flanges, a flexible resilient metallic movable contact member comprising a substantially flat central portion secured adjacent the midpoint to said body and insulated from said fixed contact, outwardly extending hairpin sections on the opposite ends of said central portion, each hairpin section having an inwardly extending arm overlapping and normally engaging the adjacent flange on said fixed contact to complete an electrical circuit through said contacts, an insulated stud secured to each hairpin section and disposed in engagement with two vehicle doors when in closed position to hold said arms out of engagement with said flanges to open the electrical circuit, the opening of either door permitting the adjacent arm to move into engagement with the associated flange to complete the electrical circuit.

2. A switch as defined in claim 1, in which said movable contact including said central portion, said hairpin sections and said arms comprises a single integral member.

3. A switch as defined in claim 1, and including a three position switch mounted on said body, said three position switch being connected in the electrical circuit containing said first-mentioned switch in a manner whereby with said three position switch in one position the circuit is open and said first-mentioned switch is inoperative, with said three position switch in a second position the circuit is closed and said first-mentioned switch is bypassed to render the same inoperative and with said three position switch in a third position the circuit is closed and the first-mentioned switch is operative to control the circuit.

4. A switch for controlling a lamp of a motor vehicle in response to opening and closing of the doors of the vehicle, said switch comprising a generally triangular rocker plate, biasing means engaging the geometrical center of said plate on one side to urge said plate in one direction, a movable contact on the opposite side of said plate at the geometrical center, a fixed contact in the path of movement of said movable contact, spaced slidable stud members engaging said opposite side of said plate at two adjacent vertexes thereof and engaging two adjacent doors of the vehicle when in closed position, means for limiting movement of said studs when the doors of the vehicle are open and a pivotally mounted stop means adjacent the third vertex of said plate and selectively movable to three positions, said stop means in one position being clear of said plate whereby said biasing means will move said movable contact into engagement with said fixed contact with the doors in closed position, said stop means in a second position engaging said opposite side of said plate at a point inwardly of said third vertex to permit rocking movement of said plate about said point upon opening of either or both doors to move said movable contact into engagement with said fixed contact and said stop means in a third position engaging said opposite side of said plate at a point inwardly of said first-mentioned point to prevent engagement of said movable contact with said fixed contact upon opening of either or both doors.

References Cited in the file of this patent

UNITED STATES PATENTS

| 1,675,026 | Goldthwaite | June 26, 1928 |
| 2,089,850 | Kenney | Aug. 10, 1937 |
| 2,779,836 | Williams | Jan. 29, 1957 |
| 2,790,044 | Booth | Apr. 23, 1957 |

FOREIGN PATENTS

| 1,266,541 | France | June 5, 1961 |